United States Patent [19]

Wood

[11] 3,950,038

[45] Apr. 13, 1976

[54] FLUID BEARING TRACK DEVICE

[75] Inventor: Kenneth G. Wood, Seattle, Wash.

[73] Assignee: Aero-Go Engineering & Development Co., Seattle, Wash.

[22] Filed: June 12, 1972

[21] Appl. No.: 261,637

[52] U.S. Cl. ............... 305/34; 180/9.2 R; 180/125
[51] Int. Cl.² ................. B62D 55/00; B60V 1/00
[58] Field of Search .......... 305/34, 24, 14; 180/7 J, 180/7 R, 115, 116, 119, 121, 127, 125, 124, 9.48, 9.46, 9.2 R; 280/43.23

[56] References Cited
UNITED STATES PATENTS

| 809,048 | 1/1906 | Furchtbar | 180/9.2 R |
|---|---|---|---|
| 2,900,210 | 8/1959 | Parsons | 305/14 |
| 2,964,361 | 12/1960 | Hansen | 305/39 |
| 3,168,155 | 2/1965 | Cockerell | 180/125 |
| 3,185,238 | 5/1965 | Coates | 180/125 |
| 3,261,418 | 7/1966 | Bertin | 180/115 |
| 3,268,023 | 8/1966 | Dinapoli | 180/115 |
| 3,331,461 | 7/1967 | Eggington | 180/119 |
| 3,357,511 | 12/1967 | Mackie | 180/125 |
| 3,513,936 | 5/1970 | Crowley | 180/124 |
| 3,528,675 | 9/1970 | Brown | 280/43.23 |
| 3,664,448 | 5/1972 | Hudis | 180/9.46 |

FOREIGN PATENTS OR APPLICATIONS

| 880,115 | 6/1953 | Germany | 180/9.46 |

*Primary Examiner*—George E. A. Halvosa
*Assistant Examiner*—Reinhard J. Eisenzopf
*Attorney, Agent, or Firm*—Christensen, O'Connor, Garrison & Havelka

[57] ABSTRACT

A combination of a fluid bearing having the capability of lifting large loads off of a smooth surface so that they may be easily moved, with a track device having a transversely ribbed continuous belt, the belt being supported by two rollers. The fluid bearings are so situated on supporting elements within the area of the belt that the pressure from the fluid bearing is directed in a downward direction upon the inner surface of the continuous belt, the belt being free to revolve and thus move the load, once sufficient pressure is applied to lift the load off the inner surface of the belt.

19 Claims, 18 Drawing Figures

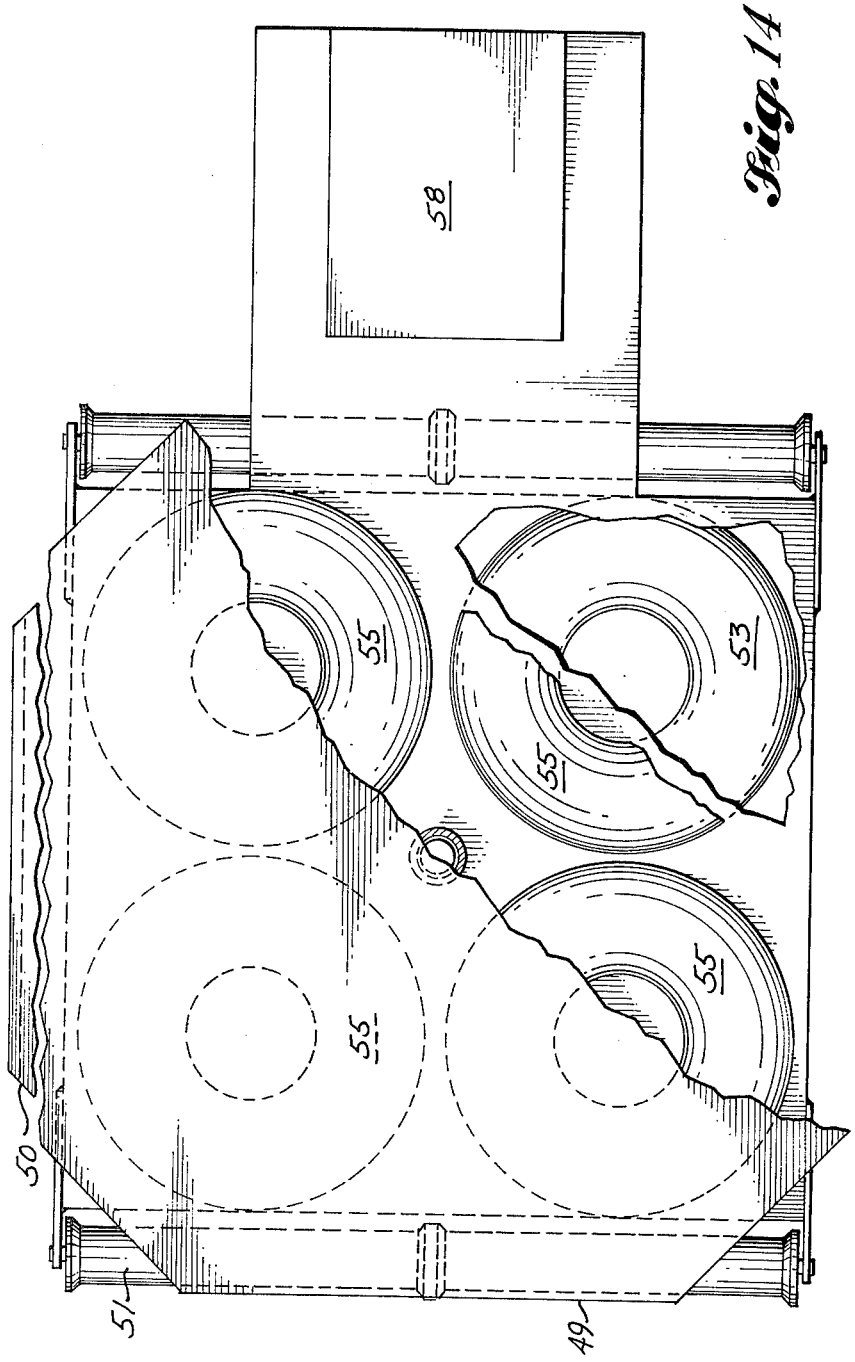
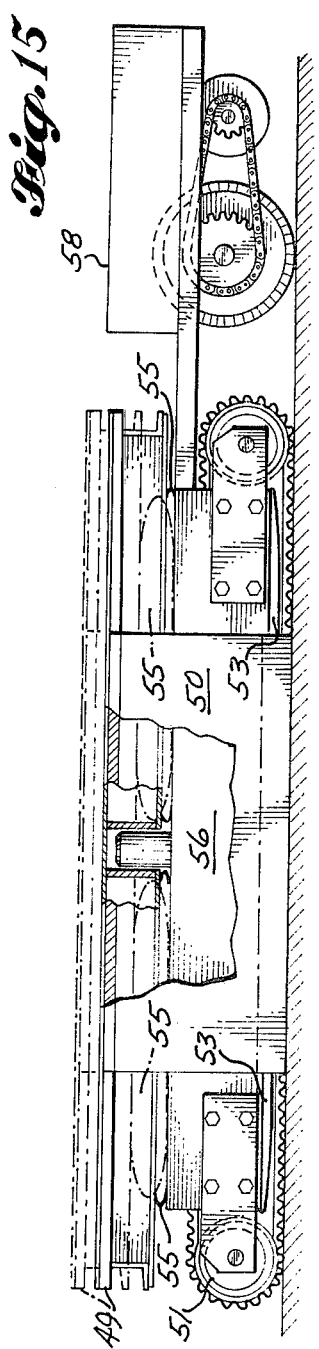

FLUID BEARING TRACK DEVICE

BACKGROUND OF THE INVENTION

This invention relates generally to fluid bearings, and more particularly, to fluid bearings in combination with track devices to provide a capability of moving over rough and/or discontinuous surfaces.

It is known from the prior art that very large and heavy loads may be easily moved to new locations or reoriented in specific directions by means of a device known generally as a fluid bearing. Such a bearing is shown in U.S. Pat. No. 3,513,936 to Crowley. This patent shows the use of a rubberized torus shaped device, into which is forced air under constant pressure. The torus is inflated to a maximum point, at which point air begins to seep out into the chamber formed by the torus and the surface upon which it is resting until the downward pressure of the incoming air against the surface is sufficient to raise the fluid bearing and the load off the ground. This distance is typically on the order of a few thousandths of an inch.

The efficient operation of this device, however, required a fairly continuous, smooth surface. Discontinuous surfaces and/or surfaces which contained cracks or holes caused excessive wear on the rubberized portion of the fluid bearing, resulting in frequent replacement, or caused an excessive amount of air consumption from the pressurized air source. Furthermore, very rough surfaces and/or large discontinuities were impossible to negotiate using the prior art system of fluid bearings. Moreover, it was difficult using the prior art system, to negotiate sloping surfaces, and to maintain a high degree of directional control.

Several attempts have been made to solve the above mentioned problems, one such attempt being illustrated by the patent to Burtin, U.S. Pat. No. 3,261,418, which utilized an air cushion device in combination with a track. The particular belt used in this application was a flat, flexible, rubberized belt well known in the prior art for use in other track devices. Another example of such a belted device is shown in the patent to Eggington, U.S. Pat. No. 3,331,461. It has been found, however, that the use of such a belt has limited advantages over the prior art system, as cracks and/or other discontinuities in the surface of the floor upon which the track the belt was riding still caused the combination device to lose large quantities of air, and to cause excessive wear on the bearing surfaces themselves, although the addition of a track made a slight improvement over the prior art in each of these conditions.

Although the concept of a fluid bearing in combination with a belted track itself has advantages, it is the recognition that the combination must be so designed that the inner surface of the track remains smooth and continuous, regardless of the surface upon which the device is operating, and the accompanying implementation that distinguishes the present invention in one way from the prior art.

Furthermore, the use of combinations of fluid bearings, configured in various ways with platforms and with means for stabilizing and directing the movement of the combination track device or re-orienting the load also distinguish the present invention from the stated prior art.

In view of the above description of the background of the invention and the present significant problems in the fluid bearing art, it is an object of the present invention to provide a fluid bearing track device which has the capability of moving over rough and discontinuous surfaces.

It is another object of the present invention to provide a fluid bearing track device which will significantly reduce the wear on the rubberized fluid bearing enclosure surface.

It is a further object of the present invention to provide a very smooth surface upon which the fluid bearing itself will operate.

It is a still further object of the present invention to greatly reduce the loss of air in the forced air fluid bearing system.

Other and further objects, features and advantages of the invention will become more apparent as the description of the invention proceeds in the following paragraphs.

SUMMARY OF THE INVENTION

Briefly, in accordance with a preferred embodiment of the present invention, the invention utilizes a fluid bearing of the type found and described in the prior art in combination with a belted track device, the load being supported by a structure which includes at least two rollers, around which the belt is free to revolve when the load is raised via the use of the fluid bearings. The belt is stiffer in the transverse direction than in the longitudinal direction to allow the inner surface of the belt to remain relatively smooth, even when the device is moving over rough surfaces. The bearings themselves are located on the support structure and directed toward the inner surface of the belt. When the fluid bearings are inflated, the load is raised, leaving the belt free to revolve and the track itself, supporting the load, to move in a directionally controlled and stabilized manner.

DESCRIPTION OF THE DRAWINGS

FIG. 14 is a top view, without the drive belts, partially cut away to reveal the fluid bearings of a fourth embodiment of the present invention.

FIG. 15 is an elevational view of the embodiment shown in FIG. 14.

DESCRIPTION OF THE PREFERRED EMBODIMENT

Figure 1:
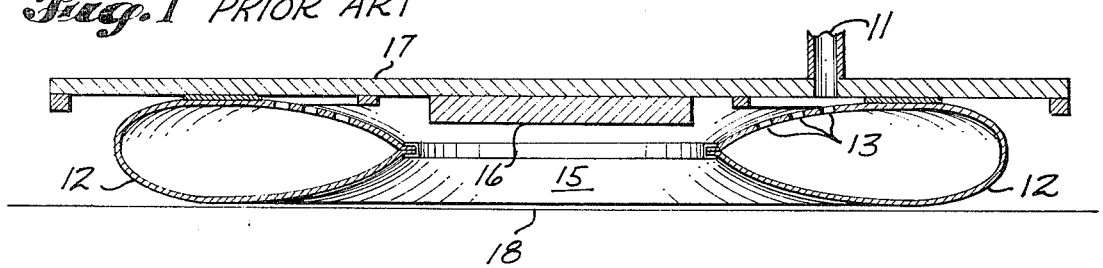
FIG. 1 is a sectional elevational view of a prior art fluid bearing.

Referring to FIG. 1, a prior art fluid bearing similar to the one used in disclosing the present invention is shown for the purpose of providing background information. Air under pressure is pumped into the bearing through opening 11. This stream of pressurized air first enters and inflates the torus 12 through a series of small openings in the surface of the torus 13. A spacer plate 16 permits the torus to start its inflation quite readily without undue resistance and hence without undue spillage of air past the bottom surface of the torus wall. As the torus becomes more fully inflated, the continuing pressure of the incoming air also fills up the chamber 15 created by the inflating torus, the lower surface of the load platform 16 and the ground surface 18 upon which the torus is resting. After the chamber is filled, the continuing pressure of the air lifts the entire device a small distance off the ground so that air seeps out between the surface of the torus and the surface 18. If the torus is of adequate size, and the pressure of the incoming air is sufficient, a lift of approximately a few thousandths of an inch will be present between the torus and the surface, and the load will thus be entirely clear of the ground, facilitating ease of movement and orientation.

Figure 2:
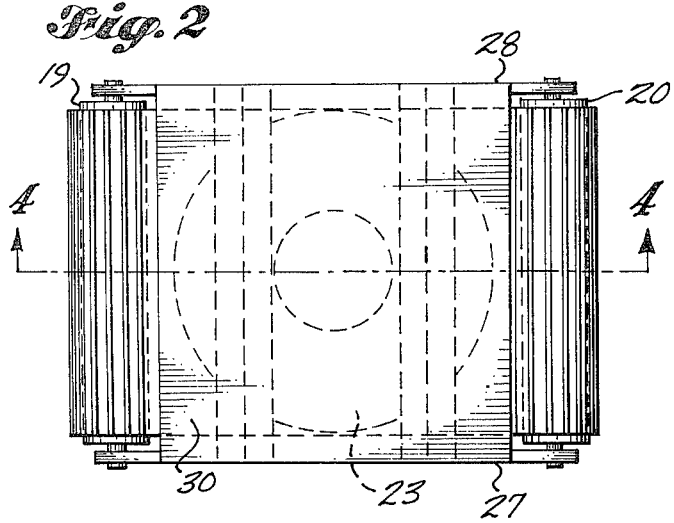
FIG. 2 is a top plan view of a first embodiment of the present invention.
Figure 3:
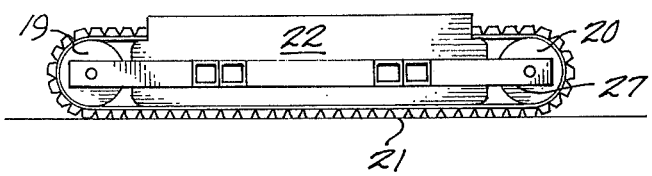
FIG. 3 is an elevational view of the first embodiment shown in FIG. 1.
Figure 4:
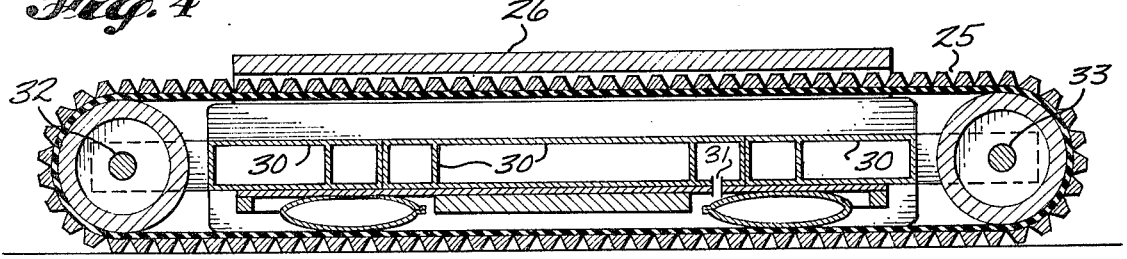
FIG. 4 is a sectional elevational view of the first embodiment, shown on a larger scale than in FIG. 2, taken along the lines 4—4.

The present invention combines the use of such a fluid bearing, with a belted track device, so as to give a significantly better capability of moving heavy loads over rough and/or discontinuous surfaces. Referring to FIGS. 2–4, the present invention is shown utilizing a single fluid bearing in combination with a continuous belt. FIG. 3 shows the use of a first roller 19 and a second roller 20 around which a ribbed belt 21 revolves. The support structure 22, shown most clearly in FIGS. 3 and 4, is designed in such a way that it physically supports the load when the fluid bearing 23 lifts (when inflated) the entire structure upward to such an extent that the ribbed belt 21 is free to move around the rollers 19–20. The support structure consists of a top platform 26 upon which the load rests, two side support members 27 and 28 which are connected rotatably to rollers 19 and 20, upon which the platform 26 rests, and an inner support member 30, which extends between and is connected to the side support members 27 and 28, and on which the fluid bearing is mounted.

In the preferred embodiment, the side support members are designed such that they rest on the ground when the fluid bearing is deflated and thus in combination with the platform, actually support the load, when the device is in a deflated mode. When the fluid bearing is inflated, the side members are lifted free of the ground, allowing the belt to move around the rollers. The support structure is so adapted that the upper portion 25 of the belt 21 is located between the platform 26 and the inner support member 30, as shown more clearly in FIG. 4.

The inner support member 30 of the supporting structure extends the entire width of the track and is attached in some normal fashion such as welding to the rest of the supporting structure at each side member of the supporting structure. This is most clearly shown in a sectional elevational view of the invention, shown in FIG. 4. This inner support member 30, which is attached to both sides of the supporting structure, is rigid, so that a fluid bearing may be mounted on it, and designed so that it does not interfere with the movement of the ribbed belt, there existing a space between the platform 26 and the inner support member 30. The belt is then positioned between the platform and the inner support member and fitted around the two rollers 19 and 20, the rollers being rotatably attached to the side members 27 and 28 at points 32 and 33 on both sides of the device. The attachment of the side members to the rollers is designed so that the rollers may revolve freely between the two side support members.

On the bottom side of the inner support member 30 is positioned the fluid bearing. The inner support member is designed so that fluid under pressure may be fed to the fluid bearing, as described above. This may be done in several ways, such as drilling an appropriate orifice in the inner support member, as shown by orifice 31 in FIG. 4 and attaching a source of pressurized fluid, or by some other such similar means.

The fluid bearing is mounted on the bottom side of the inner support member as shown in FIG. 4, the torus being positioned between the bottom of the inner support member, and the inner surface of the lower portion of the ribbed belt.

The inner portion of the belt, being relatively smooth and continuous, presents an adequate surface upon which the fluid bearing may be inflated. When the bearing is inflated, the escaping air lifts the torus, the entire support structure, including the platform, and hence the load, a small distance off of the inner surface of the belt. This leaves the ribbed belt free to revolve around the two rollers, allowing movement of extremely heavy loads over rough surfaces.

It was found that the belt should be a ribbed belt to give a track the capability of moving over rough surfaces. The transversely inflexible effect which the ribbing brings to the belt prevents the belt from "telegraphing" the roughness and/or discontinuities of the surface upon which the belt is riding to the inner surface of the belt, which is the critical surface for the fluid bearing. Thus, the use of a transversely inflexible belt with a substantially transversely straight and smooth inner surface allows the entire track device supported on its flat lower belt run to move over very rough surfaces with good control, while also providing a very smooth continuous surface (the inner surface of the belt) for the operation of the fluid bearing. Furthermore, the use of a ribbed belt also provides traction for the movement of the device, especially when it is to be power driven. When the belt is thus to be power-driven, its lower run stretching between the lower sides of guide rollers 19 and 20 and tending therefore to present a flat or planar inside face to the fluid bearing element despite ground surface irregularities is simply stretched tighter by the driving force. Therefore, it is clear that the device is well-suited to be self-powered as well as to be pushed or pulled by external sources of motive force. This combination solves the problems of prior art in that it prevents excessive wear on the fluid bearing, it utilizes the compressed air in the most efficient manner and does not cause large leakage, and the track device itself can move over surfaces which the original fluid bearing by itself could not negotiate. Furthermore, various combinations of track devices may be used for stabilizing and directing the movement of heavy loads.

Figure 5A:
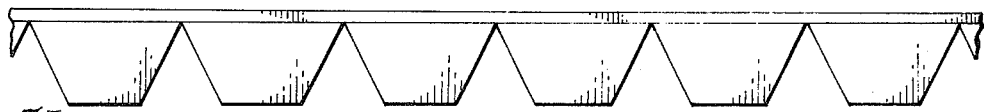
FIG. 5A, 5B, 5C and 5D are representative belt tread designs that may be used in the present invention.
Figure 5B:
Figure 5C:
Figure 5D:
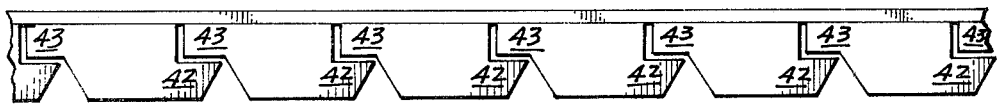

The design of the ribs on the belt can be extremely varied, depending upon the particular application in which it is to be used. FIG. 5 shows several variations on the ribbed belt, the variations A, B, C and D giving progressively more structural strength and rigidity to the transverse rib members. Thus the configuration of the rib shown in FIG. 5D is more rigid than the previous variations because of the interlocking surfaces of adjacent ribs 42, 43. Generally in the case of raised ribs, the more lateral support adjacent ribs have, the greater the transverse rigidity.

The belt is transversely ribbed so as to make the belt as inflexible as possible in one direction, thereby absorbing roughness and discontinuities of the actual surface over which the track is to be moved, while maintaining sufficient flexibility in the longitudinal direction so that the belt can be used with rollers, as shown in the preferred embodiment. Therefore, as shown in FIG. 5, there are many variations of rib design possible, each design giving a different transverse flexibility, and hence, structural strength. Furthermore, a continuous transversely raised rib will provide more rigidity than one not continuous. It should be noted, however, that each of the inner surfaces of all the variations are smooth, slick, and non-porous, a good surface for use with a fluid bearing.

Figure 6:
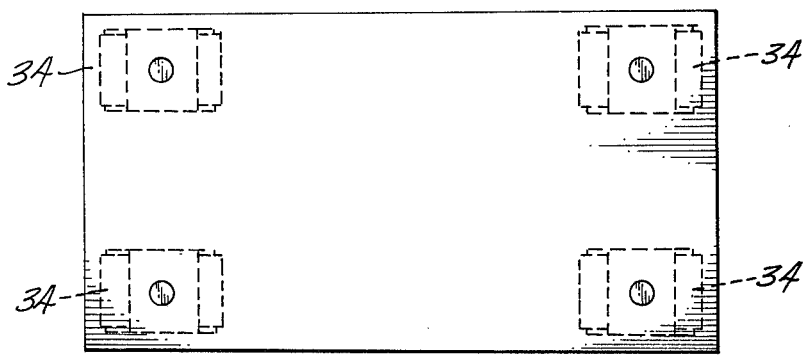
FIG. 6 is a simplified top plan view of a second embodiment of the present invention.
Figure 7:
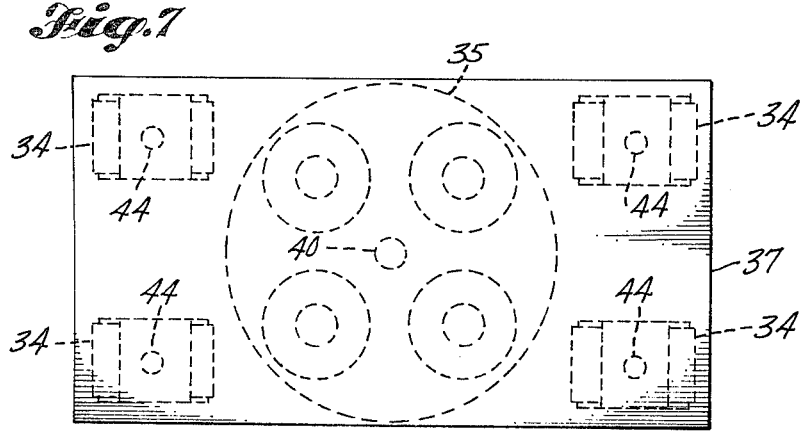
FIG. 7 is a simplified top plan view of a third embodiment of the present invention.
Figure 8:
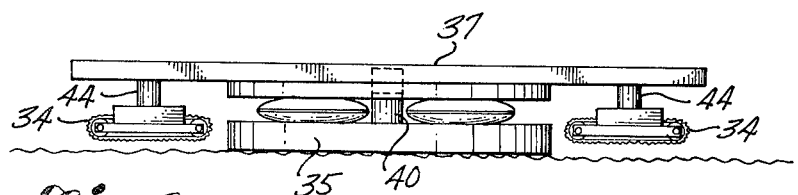
FIG. 8 is an elevational view of the third embodiment depicted in FIG. 7 with the load platform elevated by an auxiliary fluid bearing, the elevation being sufficient to lift the track devices clear of the ground.
Figure 9:
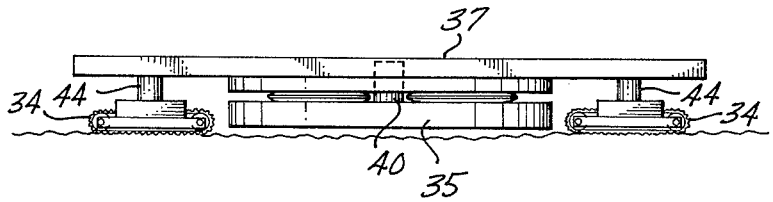
FIG. 9 is an elevational view of the third embodiment of the present invention with the load platform in a lowered position.
Figure 10:
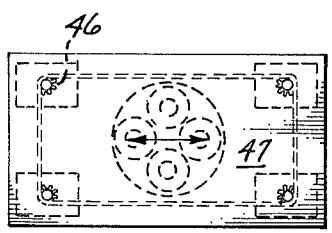
FIGS. 10, 11, 12, and 13 are representations of the various directions of relative movement possible through coordinated angular positioning of the track devices used in the embodiments of FIG. 6 and 7 of the present invention.
Figure 11:
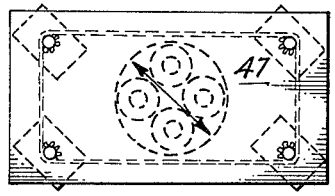
Figure 12:
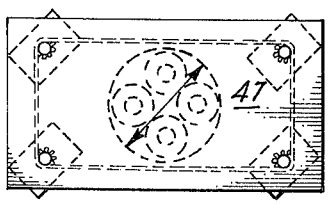
Figure 13:
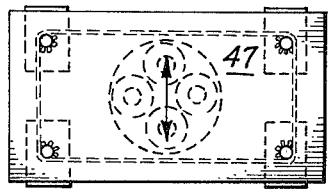

Second and third embodiments are shown in FIGS. 6 through 15. FIG. 6 shows the use of a platform for supporting a load which is in turn supported by four individual fluid bearing track devices 34—34 of the type previously described. It also may incorporate a turntable 35, as shown in FIG. 7 for use in turning the entire platform, the turntable itself utilizing additional fluid bearings to perform its turning function. This device may be used without the turntable, although the turntable provides additional maneuvering (orientational) capability. Each one of the fluid bearing track devices shown in FIG. 6 is similar to that described above. As shown in FIGS. 10, 11, 12, and 13, the track devices themselves are rotatably secured through mount 44 (FIG. 8) to the platform carrying the load so that when the four track devices are rotated in a similar direction, the entire platform can move in that direction, either forward or backward as shown in FIG. 10, or at various angles as shown in FIGS. 11 and 12, or from side to side as shown in FIG. 13. The coordinated movement of the four track devices may be achieved by various methods, an example of which is shown in FIG. 10. Each of the rotatable connections 44—44 has an attached sprocket 46, which can receive a chain 47, to link all four devices together. Coordinated movement of all the track devices is thus achieved.

Furthermore, the invention may have a turntable, as shown in FIGS. 7–13, for rotating the bed or platform of the invention so that the load may be reoriented relative to the direction of movement. FIGS. 8 and 9 show the operation of the turntable. The turntable itself utilizes fluid bearings between the platform 37 and the turntable 35, the turntable itself being rotatably and slidably mounted to the platform. Fluid bearings are secured to the bottom of the platform, displaced towards the top of the turntable. When the platform is moving, via the track devices located on each of its corners, the turntable fluid bearings are deflated so that the turntable does not interfere with the movement of the platform, as shown in FIG. 9. However, when the platform is at rest, and it is desired to reorient the platform relative to the previous direction of movement, the fluid bearings between the turntable 35 and the platform 37 are inflated, lifting the four track devices entirely free of the ground. The turntable 35 is connected to the platform 37 through a rotatable, slidable mount 40, adapted so as to permit relative movement between turntable 35 and platform 37. The fluid bearings of the turntable are now supporting the load, which is resting on the platform. The load is thus raised a few thousandths of an inch above the turntable which is resting on the ground. The platform is now free to be rotated through the mount 40, so that the orientation of the platform and hence, the load, may be changed relative to the previous direction of movement. When the device is moving, the turntable may be maintained in the raised position by a number of means, including a series of hooks, or the like, or by utilizing a doubleacting piston arrangement under pressure. Thus, through the use of pivotally mounted tracks, and a turntable utilizing fluid bearings, a heavy load may be moved in any direction by the track system.

Another embodiment of the invention is shown in FIGS. 14 and 15. It is similar in principle to the embodiments just described. This embodiment utilizes two belted tracks side-by-side under a platform 49 carrying the load. It utilizes two identical banks of four fluid bearings. The platform has two identical side supports, 50, located on opposing sides, which support the load when the fluid bearings are all deflated, allowing for directional control of the track device. The platform is rotatably, slidably mounted to the support structure 56 which is in turn attached to the roller devices 51 and 52. The two belts run lengthwise nearly the entire length of the platform and revolve around the two rollers. A first set of fluid bearings 53-53 are mounted on the support structure 56, similar to the previous embodiments, in such a way that when inflated they will be directed toward the inner surface of the belt, and will lift the entire load off this inner surface, thus allowing the belt to revolve around the rollers and freely move the device, again similar to that shown in previous embodiments.

Since the platform is rotatably, slidably mounted to the support structure, it may be rotated by inflating a second set of fluid bearings 55—55 which are located on the bottom side of the platform 49 and above the support structure 56. When the second set of bearings is inflated, the platform may be rotated through an angle relative to the previous direction of movement. Rigidly attached to this track system is a means for moving the track under power 58 such as with a diesel or an electric motor. This embodiment allows for the movement of very heavy loads on a support structure which has a multi-directional capability, and which may be operated under positive guidance and power.

Although a preferred embodiment of the invention, and several alternative embodiments have been disclosed herein for purposes of illustration, it will be understood that various changes, modifications, and substitutions may be incorporated in such embodiments without departing from the spirit and scope of the invention as will be defined by the claims which follow.

What is claimed is:
1. A fluid bearing track device for moving heavy loads on a cushion of air over a nonsmooth surface, comprising in combination:
means defining a first rigid support member;
fluid bearing means comprising an inflatable, flexible walled diaphragm of generally annular configuration defining a hollow central portion depending from one surface of said rigid support member;
a continuous belt positioned around said first rigid support member and said fluid bearing means, said continuous belt having a substantially smooth, nonporous inner surface; and
means for movably supporting said continuous belt around said first rigid support member and said fluid bearing means, such that said continuous belt includes an upper run and a lower run, said movably supporting means supporting said belt with the portion forming said lower run extending substantially straight for bearing on said nonsmooth surface, said one surface of said rigid support member, said hollow central portion of said flexible wall diaphragm, and the inner surface of said lower run, forming a plenum chamber such that when said sufficient fluid is fed into said plenum chamber a small amount of fluid escapes between said diaphragm and said inner surface of said lower run, forming a continuous cushion of air of substantial uniform thickness around the periphery thereof.

2. An apparatus in accordance with claim 1, including turntable means for changing the direction of movement of said track device, said turntable means being rotatably connected to said support means.

3. An apparatus in accordance with claim 2 wherein said turntable means includes at least a second fluid bearing, said turntable means directly supporting said load.

4. A fluid bearing track device for moving heavy loads on a cushion of fluid over a nonsmooth surface, comprising in combination:
means defining a first rigid support member;
fluid bearing means defining a flexible walled torus depending from one surface of said rigid support member;
a continuous belt positioned around said first rigid support member and said fluid bearing means, said continuous belt having a substantially smooth, nonporous inner surface; and
means for movably supporting said continuous belt around said first rigid support member and said fluid bearing means, such that said continuous belt includes an upper run and a lower run, said movably supporting means supporting said belt with the portion forming said lower run extending substantially straight for bearing on said nonsmooth surface, said one surface of said rigid support member, said flexible wall torus and the inner surface of said lower run forming a plenum chamber such that when sufficient fluid is fed into said plenum chamber a small amount of fluid escapes between said torus and said inner surface of said lower run, forming a continuous cushion of fluid of substantially uniform thickness around the periphery thereof.

5. A device in accordance with claim 4, wherein the peripheral thickness of said cushion of fluid is substantially on the order of several thousandths of an inch.

6. An apparatus in accordance with claim 5, wherein said carrying means is a platform supported free of said belt by said supporting means.

7. A device in accordance with claim 4, wherein said continuous belt is relatively inflexible in a transverse direction as compared to a longitudinal direction.

8. An apparatus in accordance with claim 7 wherein said belt includes individual stiffening means extending in the transverse direction of said belt.

9. An apparatus in accordance with claim 8 wherein said stiffening means extends continuously in said transverse direction across said belt.

10. An apparatus in accordance with claim 9 wherein said transverse stiffening means are raised ribs of material extending across said belt.

11. A device in accordance with claim 7, wherein said movably supporting means includes means connected to said movably supporting means for carrying said load.

12. A device in accordance with claim 11, wherein said movably supporting means includes at least two rollers, said continuous belt being positioned around said rollers to define said upper run and said lower run.

13. A device in accordance with claim 12, wherein said track device includes means for connecting said plenum chamber with an external source of pressurized fluid for inflating said fluid bearings and filling said plenum chamber, such that a cushion of air is created between said flexible wall torus, and said lower run of said continuous belt.

14. A device in accordance with claim 11, wherein said track device includes a means for moving said track device and said load.

15. In combination, a plurality of fluid bearing track devices, each comprising:
means defining a first rigid support member;
fluid bearing means defining a flexible wall torus depending from one surface of said rigid support member;
a continuous belt positioned around said rigid support member and said fluid bearing means, said continuous belt having a substantially smooth, nonporous inner surface and being relatively inflexible in a transverse direction as compared to a longitudinal direction;
means for movably supporting said continuous belt around said first rigid support member and said fluid bearing means, such that continuous belt includes an upper run and a lower run, said movably supporting means supporting said belt with the portion forming said lower run extending substantially straight for bearing on said nonsmooth surface, said one surface of said rigid support member, said flexible wall torus, and the inner surface of said lower run forming a plenum chamber such that when sufficient fluid is fed into said plenum chamber a small amount of fluid escapes between said torus and said inner surface of said lower run, forming a continuous cushion of air of substantially uniform thickness at its periphery; and
the combination further comprising: means common to each of said plurality of fluid bearing track devices for carrying a load, said fluid bearing track devices being rotatably connected to said load carrying means.

16. An apparatus according to claim 15, including means for rotating said plurality of fluid bearing track devices in unison so that said plurality of fluid bearing track devices are continuously oriented in an identical direction.

17. An apparatus according to claim 16, including a turntable means, rotatably connected to said load carrying means for changing the orientation of said load carrying means.

18. An apparatus according to claim 17, wherein said turntable means includes a turntable platform, a rotatable, slidable mount connecting said turntable platform with said load carrying means, and at least a second fluid bearing, said second fluid bearing mounted on said load carrying means, and displaced toward said turntable platform, said turntable platform and said mount being adapted so that said plurality of fluid bearing track devices are not in contact with a ground surface when said second fluid bearing is inflated.

19. An apparatus according to claim 16, wherein each of said plurality of fluid bearing track devices may be rotated 360° relative to said load carrying means.

* * * * *